United States Patent Office 3,017,384
Patented Jan. 16, 1962

3,017,384
ORGANOPOLYSILOXANE FIBERS
Frank J. Modic, Scotia, N.Y., assignor to General Electric Company, a corporation of New York
No Drawing. Filed Jan. 18, 1960, Ser. No. 2,846
3 Claims. (Cl. 260—46.5)

This application is a continuation-in-part of my copending application Serial No. 639,858, filed February 13, 1957, and now abandoned.

This invention relates to new and useful organopolysiloxane compositions. More particularly, the invention relates to tack-free organopolysiloxanes characterized by their toughness and ability to be drawn or made into film or fibrous form and which are also useful as impregnants or reinforcement for weaker materials. Specifically the invention relates to organopolysiloxane compositions compositions comprising the product of reaction of (1) a hydroxy-containing organopolysiloxane reaction products of a trialkyl hydrolyzable silane and an alkyl silicate and (2) a linear, fluid, high viscosity organopolysiloxane containing terminal silicon-bonded hydroxy groups.

While organopolysiloxane polymers have been provided in varied and diverse form, so far as is known none have been provided which are tough and capable of being drawn into sheets or films and fibers of desirable strength.

It is, therefore, an object of this invention to provide unique tack-free organopolysiloxane materials which are tough and which may be drawn into films or fibers of high strength.

Briefly stated and in its broadest sense, my invention comprises the process and the product resulting therefrom in which there is intercondensed (1) from 69 to 97 parts by weight of an organopolysiloxane cohydrolysis product of a trialkyl hydrolyzable silane and an alkyl silicate (either in the monomeric or polymeric state), in which the hydrolyzable silane and the silicate are reacted in the ratio of from 0.33 to 0.55 mole of hydrolyzable silane per mole of silicate and (2) 3 to 31 parts by weight of a linear, high viscosity organopolysiloxane fluid having terminal silicon-bonded hydroxy groups.

The trialkyl hydrolyzable silane used in the preparation of the resin corresponds to the general formula

where R is a lower alkyl radical (e.g., methyl, ethyl, propyl, isopropyl, butyl, isobutyl, etc.), and X is a hydrolyzable group, for instance, halogen (e.g., chlorine, bromine, fluorine, etc.), alkoxy radical (e.g., methoxy, ethoxy, etc.), acyloxy, etc. It is essential that R be a lower alkyl radical since higher alkyl radicals undesirably slow down the hydrolysis of the $R_3SiX$ compound and cause a type of intercondensation with the alkyl silicate, which leads to less desirable products. Of course, R may be the same or different lower alkyl radicals.

The alkyl silicate employed for cohydrolysis with the trialkyl hydrolyzable silane corresponds to the general formula

or a polyalkyl liquid silicate obtained by hydrolyzing the monomeric silicate to a stage where it is still liquid and has a viscosity below about $0.5 \times 10^6$ centipoises. R in the above formula may be the same as that described for the trialkyl hydrolyzable silane and again obviously may be the same or different lower alkyl radicals disposed around the silicon atom.

Hydrolysis of the monomeric silicates to form the polymeric alkyl silicates containing a plurality of silicon-bonded hydroxy groups may be accomplished by incorporating in the monomeric silicate (for instance, monomeric ethyl orthosilicate) acidic materials which will effect hydrolysis, for instance, hydrochloric acid, sulfuric acid, phosphoric acid, etc. Acid-forming metallic salts, for instance, ferric chloride, aluminum chloride, etc., may also be used for similar purposes. When employing the polymeric liquid alkyl polysilicate (for instance, polyethyl silicate), the hydrolysis is carried out in such a manner that in addition to there being present silicon-bonded alkoxy radicals (where the alkyl group is a lower alkyl radical), there will also be present a plurality of silicon-bonded hydroxyl groups. These silicon-bonded hydroxyl groups are required for interaction with the trialkyl hydrolyzable silane in the hydrolysis medium and for further reaction with the organopolysiloxane fluid in forming the final product. The availability of silicon-bonded hydroxyl groups when working with a monomeric alkyl silicate is provided in the hydrolysis medium of the trialkyl hydrolyzable silane whereby the hydrogen halide acid liberated as a result of hydrolyzing a hydrolyzable silane containing a silicon-bonded halide, e.g., chlorine as the hydrolyzable group, and hydrogen chloride as the hydrohalide, also produces condensation of the monomeric alkyl silicate to the desired hydroxy-containing polyalkyl silicate in one operation without requiring a preformed polyalkyl silicate. When cohydrolyzing an alkoxysilane with a monomeric alkyl silicate, it is necessary to add a small amount of an acid such as hydrochloric acid, to effect hydrolysis and intercondensation.

The cohydrolysis of the trialkyl hydrolyzable silane and the alkyl silicate (this designation for the silicate is intended hereinafter to include both the monomeric and polymeric forms of the alkyl silicate) is relatively simple and merely requires addition of the trialkyl hydrolyzable silane and the alkyl silicate to a suitable solvent, such as toluene, benzene, xylene, etc., and thereafter addition of the solution of the ingredients to a sufficient amount of water to provide the desired hydrolysis and co-condensation in a suitably acidic medium. The choice of the solvent depends on various considerations such as the particular trialkyl hydrolyzable silane and alkyl silicate used, the relative proportions of the ingredients, the effect of the solvent on processing the hydrolysis and co-condensation product, etc. In this respect, water-miscible solvents such as alcohols, ketones, esters, etc., should be avoided since these materials do not provide for adequate separation between the hydrolysis product and the water of hydrolysis so as to give satisfactory recovery of the reaction product of the trialkyl hydrolyzable silane and the alkyl silicate. The amount of solvent used may be varied widely but advantageously, by weight, it is within the range of from about 0.25 to 2 parts solvent per part of cohydrolyzate, that is, the trialkyl hydrolyzable silane and the alkyl silicate.

The amount of water used for hydrolysis is generally not critical and may be varied within wide ranges. The minimum amount of water required is that necessary to hydrolyze all the silicon-bonded hydrolyzable groups in the trialkyl hydrolyzable silane and all the alkoxy groups in the alkyl silicate. The maximum amount of water is generally determined by the ease with which the co-hydrolyzate can be processed to isolate the co-hydrolysis product or resin (the term "resin" is hereinafter intended to refer to the co-hydrolyzate of the trialkyl hydrolyzable silane and the alkyl silicate whether in polymeric or monomeric form). If too much water is employed, the amount of acid present (either the hydrogen halide resulting when using trialkyl halogenosilanes or the acid, such as hydrochloric acid or sulfuric acid which must be added to effect cohydrolysis of non-acid-producing trialkyl hydrolyzable silanes, such as trialkyl alkoxysilanes) is diluted to a point where the degree of condensation is so lowered that the de-alkoxylation of the alkyl silicate essential in the preparation of the resin is undesirably reduced and the necessary minimum level of silanol groups in the resin is not obtained. Conversely, if one uses too little water for hydrolysis purposes, the concentration of the alkanol resulting from the co-hydrolysis reaction is raised to such a high point that there is insufficient phase separation, again making it difficult to separate the resin from the hydrolysis medium and undesirably reducing the yield of resin because of unavoidable losses resulting in increased solubility of the resin in the alcohol phase. This makes it difficult and impractical to attempt to recover this alcohol-soluble resin portion. At least from 2 to 3 moles of water per total molar concentration of the trialkyl hydrolyzable silane and the alkyl silicate should be used. In general, the amount of water used should be as low as possible to assist in good yields of the resin while utilizing to the fullest extent the space available in equipment used for hydrolysis purposes. An upper range of water which may be satisfactorily used is of the order of about 40 to 50 moles per mole of the mixture of trialkyl hydrolyzable silane and alkyl silicate.

For optimum properties in the final tack-free product, that is, for toughness, tensile strength and susceptibility to being formed or drawn into sheets, films or fibers, I have found that in the final product the broad range of trialkyl hydrolyzable silane is from about 0.33 to 0.55 mole per mole of the alkyl silicate. The preferable range of a trialkyl hydrolyzable silane is from about 0.45 to 0.55 mole per mole of the alkyl silicate. In the preparation of the resin there can be added other co-hydrolyzable materials such as dimethyldichlorosilane and methyltrichlorosilane in amounts up to about 5% by weight based on the weight of the trialkyl hydrolyzable silane. However, the tough fiber and film forming qualities of the final product are realized without the additional materials.

In preparing the resin, the trialkyl hydrolyzable silane and alkyl silicate are dissolved in a suitable solvent, and added with stirring to the water of hydrolysis, advantageously using temperatures of from 60 to 85° C. Thereafter, the two-phase system thus obtained is processed to remove the water-alcohol layer and the remaining resinous material is neutralized with a sufficient amount of sodium bicarbonate or other alkaline material to give a pH of at least about 6 or 7. Thereafter, the resin is filtered and advantageously adjusted to a resinous solids content of about 30 to 65 percent, using, where necessary, additional amounts of solvents such as toluene, xylene, etc., in order to avoid premature gelation of the resin and to maintain its stability for a time sufficient to permit its use with the fluid. This solids content adjustment is usually only required where improper proportions of reactants and solvent are originally used.

The linear, high viscosity organopolysiloxane fluid containing terminal silicon-bonded hydroxyl groups used for co-reacting with the above-described trialkyl hydrolyzable silane and alkyl silicate must, of necessity, have end groups composed of silicon-bonded hydroxyl groups to permit ready copolymerization with the resin. For this purpose, I have found that starting materials corresponding to the general formula $$(R'R''SiO)_n$$

are most suitable for making the fluid, where R' and R'' are organic radicals. These organic radicals are attached to silicon by silicon-carbon linkages and are selected from the class consisting of alkyl radicals (e.g., lower alkyl radicals, many examples of which have been given above, hexyl, decyl, etc.), aryl radicals (e.g., phenyl, diphenyl, naphthyl, etc.), alkaryl radicals (e.g., tolyl, xylyl, ethylphenyl, etc.), aralkyl radicals (e.g., benzyl, phenylethyl, etc.), haloaryl radicals (e.g., chlorophenyl, tetrachlorophenyl, difluorophenyl, etc.), alkenyl radicals (e.g., vinyl, allyl, etc.) which should be present in amounts less than 5 to 10 percent of the total number of organic radicals in the starting materials, and where $n$ is an integer equal to at least 3, e.g., from about 3 to 10 or more, depending upon the organic groups in the starting organopolysiloxanes.

The above-described starting cyclic organopolysiloxanes are eminently suitable for preparing the high viscosity fluids used in the practice of the present invention because of the ability to obtain readily terminal silanol groups on condensation with suitable catalysts. In general, it is desirable and in some respects critical that the lower alkyl groups, specifically methyl groups, constitute at least 50 percent and preferably from about 70 to 100 percent, of the total number of organic groups attached to silicon by carbon-silicon linkages. For this purpose, I have found that in making the fluids, cyclic polymers of dimethylsiloxane are advantageously used for the purpose. Among such cyclic polymers may be mentioned, for instance, hexamethylcyclotrisiloxane, octamethylcyclotetrasiloxane, decamethylcyclopentasiloxane, etc. Of course, mixtures of these cyclic organopolysiloxanes can be employed so long as the number of silicon-bonded methyl groups constitutes a major proportion of the total number of organic groups. Thus, one can employ, for instance, a mixture of octamethylcyclotetrasiloxane and a cyclic polymer of ethyl methylsiloxane having the formula $$[(CH_3)(C_2H_5)SiO]_4$$

mixtures of cyclic polymers of dimethylsiloxane with cyclic polymers of methyl vinyl siloxane, etc. When employing cyclic polymers of dimethylsiloxane with other cyclic polymers in which the organic groups of the latter cyclic polymers are short such as silicon-bonded ethyl and vinyl groups, the molar ratio of the latter two aliphatic hydrocarbons can be higher than when using longer chain aliphatic groups (e.g., from 3 to 6 carbon atoms in the chain) with the cyclic methyl polysiloxanes.

I can obtain products having desirable features of toughness and film forming ability by employing a combination of a cyclic methyl polysiloxane and a cyclic phenyl siloxane, as, for instance, a mixture of octamethylcyclotetrasiloxane and octaphenylcyclotetrasiloxane having the formula $$[(C_6H_5)_2SiO]_4$$

Alternatively, instead of employing the cyclic phenyl siloxane with the cyclic methyl siloxane, one can use with the cyclic methylpolysiloxane a cyclic methyl phenyl siloxane of the formula $$[(CH_3)(C_6H_5)SiO]_m$$

where $m$ is an integer equal to at least 3, for example, from about 3 to 6, taking into account that in the latter methyl phenyl siloxane there are present methyl groups which will permit smaller amounts of the cyclic methyl siloxane to be used to obtain the desired ratio of methyl groups to phenyl groups in the prepared organopolysiloxane fluid.

The number of silicon-bonded phenyl groups present in the high viscosity fluid containing terminal silicon-bonded hydroxyl groups (which, for brevity, will hereinafter be referred to as "fluid") should be maintained within such a range that for each phenyl group attached directly to silicon by a carbon-silicon linkage, there are present from 10 to 100 silicon-bonded methyl groups. A preferred range is, for instance, from about 12 to 25 methyl groups per phenyl group. It will, of course, be apparent to those skilled in the art that instead of using the cyclic methyl polysiloxane alone or a mixture of the latter with another copolymerizable cyclic organopolysiloxane, many examples of which have been given above, additional mixtures, for instance, a cyclic methyl polysiloxane, a cyclic ethyl polysiloxane, and a cyclic phenyl polysiloxane may be employed without departing from the scope of the invention.

In preparing the siloxane fluid from the starting cyclic organopolysiloxane, the latter (which includes mixtures of cyclic organopolysiloxanes) is advantageously heated at temperatures of about 125 to 150° C. with small amounts of a siloxane rearrangement catalyst (about 0.001 to 0.1 percent, by weight, based on the weight of the cyclic organopolysiloxane) such as potassium hydroxide, cesium hydroxide, tetramethyl ammonium hydroxide, tetrabutyl phosphonium hydroxide, etc. The temperature and time at which this heating will take place will vary depending upon such factors as the type of organopolysiloxane employed, the siloxane rearrangement catalyst used, the concentration of the catalyst, the desired viscosity, etc. Certain siloxane rearrangement catalysts effect the desired polymerization of the organopolysiloxane more rapidly and at lower temperatures than others. In general, the polymerization is carried out for a time sufficient to obtain a high molecular weight product preferably having a viscosity within the range of about 75,000 to 125,000 centipoises.

After the above polymerized product is obtained, it is treated in order to obtain terminal silicon-bonded hydroxy groups on the molecules of the organopolysiloxane for co-reaction with the hydroxyl groups of the resin. This can be readily accomplished by blowing steam across the surface of the polymer or through the polymer for a sufficient time to give the desired silanol content. The use of steam in this fashion will cause a decrease in the viscosity of the polymer while at the same time will increase the silanol content of the organopolysiloxane. By means of this action, a maximum level of silanol, i.e., each linear polysiloxane molecule will have a terminal silicon-bonded hydroxy group. However, such a product, although it can be used in this form for co-reaction with the resin, can more readily be condensed with the resin if the molecular weight and thus the viscosity is at a higher level. For this purpose, the high-silanol-containing organopolysiloxane, which still contains the siloxane rearrangement catalyst (or to which additional catalyst may be added) is again heated at about 125° to 150° C. or above, to obtain a higher viscosity material, for instance, one having a viscosity of about 200,000 to 2,000,000 centipoises as measured at 25° C. with a Brookfield viscosimeter. The preferred range of viscosities is from 400,000 cp. to 800,000 cp. This latter heating step is not critical and will be readily apparent to those skilled in the art as being determined by the stretch and elongation desired in the final product. Once the organopolysiloxane has reached the desired viscosity range recited above, it should be treated in order to inactivate the siloxane rearranging catalyst by suitable means. When employing alkali-metal hydroxides, such as potassium hydroxide, etc., this may readily be accomplished by incorporating an equivalent amount of, for instance, triphenyl phosphate as is more particularly disclosed and claimed in Patent 2,739,952, Linville, which is assigned to the same assignee as the present invention. By inactivating or neutralizing the siloxane rearrangement catalyst, more adequate control of the final manufacturing step can be maintained while at the same time avoiding undesirable degradation of the fluid when it is later combined with the resin and heated to obtain the final product.

The preparation of the final tack-free tough fiber and film-forming product is readily carried out by suitably mixing together the resin and the fluid and heating the mixture, preferably with agitation, to effect interaction between the ingredients. The broad range of fluid in the final product varies from 3 to 31 weight percent and preferably from 16 to 31 weight percent. To accomplish the final reaction, the resin is heated, for instance, at a temperature of about 100 to 150° C. so as to remove solvent present in the resin solution. The fluid can be added directly to the resin solution or, alternatively, part of the solvent can be removed and the organopolysiloxane fluid then added and the mixture of ingredients further heated at temperatures ranging from about 100 to 150° C. for times of the order of one-half to six hours until a product of desired characteristics is obtained. This is readily determined by periodic sampling of the reactant mixture. Instead of adding the fluid to the resin before all the solvent has been removed from the resin, one may also first remove all the solvent from the resin but extreme caution should be exercised to insure that the resin is not heated too long at the elevated temperature to cause gelation of the latter before the fluid has had a chance to interact. For this purpose and for optimum ease in handling, it is usually desirable to add the organopolysiloxane fluid to the resin before all the solvent has been removed. After a material of suitable toughness has been obtained, the interacted product is preferably dissolved in a solvent such as toluene at a convenient solids content, for example, from about 40 to 70 percent solids, which can then be advantageously employed for application to tapes, cloth, etc., by various means, for instance, brushing, spraying, knife coating, etc.

The proportion of fluid to resin employed in making the final product is critical. It is broadly within the range of from about 3 to 31 percent by weight, based on the weight of the final product. Extremely good results are obtained when, from 16 to 31 percent by weight fluid is employed in the step described above for effecting interaction between the resin and the fluid.

In order that those skilled in the art may better understand how the present invention may be practiced, the following examples are given by way of illustration and not by way of limitation.

The procedure for preparing the resins and fluids described below were essentially the same. In making the resin, the ethyl orthosilicate, trimethylchlorosilane, and toluene were charged to a reactor, and the water was added at such a rate that the temperature during the addition of the water (employing stirring throughout the period) was maintained at about 75 to 80° C., autogenous temperature, varying with proportions of water and reactants. The acid aqueous layer was then drained off and the residual organopolysiloxane layer was treated with a sufficient amount of sodium bicarbonate to neutralize essentially all the hydrochloric acid present, and thereafter the mixture was filtered.

In the following examples, the preparation of the organopolysiloxane fluids was carried out as follows. A cyclic dimethylpolysiloxane (or mixture of organopolysiloxanes) was heated to about 140° C. and 0.01 part potassium hydroxide added and the heating at 140° C. continued until the viscosity of the reaction mixture reached about 100,000 centipoises. Steam was blown across the top of the polymer until the viscosity of the polymer was reduced to about 25,000–50,000 centipoises. This treatment introduced the plurality of silicon-bonded hydroxy groups required in the fluid. At this point the steam passage was discontinued and while blanketing the surface of the polymer with nitrogen, the mixture was heated again at about 140° C. until the viscosity reached about 200,000 to 2,000,000 centipoises. At this point about 0.1 part triphenyl phosphate was intimately dispersed in the reaction product and the latter then heated an additional 30 minutes to effect neutralization and render the potassium hydroxide inert.

In the preparation of the final tough film and fiber producing polymers a solution of the resin resulting from the co-hydrolysis of the trialkyl silane and alkyl silicate and the organopolysiloxane fluid were mixed until the latter was dissolved in the former and heated under reflux conditions to a temperature of about 150° C. to 250° C. whereupon the solvent such as toluene began to boil off. After the evaporation of all toluene there remained the final tough polymer which could be readily formed or drawn into films and fibers or which could be used in solution for impregnating purposes.

The new and useful products of my invention were made following the above procedure and using the ingredients shown in Table I below. Table I presents a number of examples of materials within the scope of the present invention. For each example the table lists under the heading "Resin Cohydrolysis Product" the number of parts by weight of trimethylchlorosilane, ethyl orthosilicate, toluene and water used in the preparation of the organopolysiloxane resin cohydrolysis product. Under this same heading is also listed the number of parts by weight of resin solution reacted with the silanol chain-stopped dimethylpolysiloxane fluid and the number of parts of resin in that solution. Under the heading "Fluid" appears the weight of the silanol chain-stopped fluid reacted and the viscosity of that fluid. Under the heading "Final Product" in the table is listed the "MQ ratio" which is the mole ratio of trimethylchlorosilane to ethyl orthosilicate employed in preparing the resin cohydrolysis product. Also listed under the heading "Final Product" is the weight percent of the fluid in the final intercondensation product of the present invention.

*Table I*

| Example No. | 1 | 2 | 3 | 4 | 5 | 6 | 7 | 8 |
|---|---|---|---|---|---|---|---|---|
| Resin Cohydrolysis Product: | | | | | | | | |
| $(CH_3)_3SiCl$ | 108 | 108 | 108 | 108 | 108 | 108 | 108 | 108 |
| Ethyl Orthosilicate | 416 | 375 | 375 | 375 | 468 | 375 | 375 | 375 |
| Toluene | 224 | 225 | 225 | 225 | 275 | 225 | 225 | 225 |
| Water | 400 | 400 | 400 | 400 | 200 | 200 | 200 | 200 |
| Resin Solution Weight | 500 | 500 | 500 | 500 | 250 | 270 | 270 | 102 |
| Weight of Resin in Solution | 200 | 200 | 200 | 200 | 100 | 108 | 108 | 41 |
| Fluid: | | | | | | | | |
| Weight | 50 | 75 | 50 | 60 | 25 | 45 | 30 | 17 |
| Viscosity (millions) | 1.5 | 1.5 | 5.5 | 5.5 | 0.6 | 0.6 | 0.6 | 0.6 |
| Final Product: | | | | | | | | |
| MQ Ratio | 0.50 | 0.55 | 0.55 | 0.55 | 0.45 | 0.55 | 0.55 | 0.55 |
| Weight Percent Fluid | 20 | 27 | 20 | 23 | 20 | 29 | 22 | 30 |

In each of the above examples the trimethylchlorosilane and ethyl orthosilicate were added to the toluene solvent in a suitable container. After thorough mixing the water was added slowly with constant stirring to hydrolyze the mixture. The hydrolyzed mixture was allowed to separate into layers and the acid layer removed. The remaining toluene-resin solution was then neutralized and filtered. The organopolysiloxane fluid was next added to the resin solution and the mixture heated under reflux conditions and with constant stirring. As the temperature rose to about 70° C., alcohol or an alcohol-toluene azeotrope started to distill off and was removed from the system until the temperature reached the boiling point of toluene at about 115° C. The material was then adjusted to the desired solid content for further use or the solvent evaporated to leave the final product. The characteristics of the final product are not as desirable, if one or more of the constituents are outside the stated range. For example, too much trialkyl hydrolyzable silane for particular silicate content caused gelling whereas too little of this silane produced materials that were not desirably tough. Too much of the fluid produced too oily a material with little tensile strength. Too little of the fluid produced a material which was too brittle.

The products of the invention are readily capable of being cold drawn into tack-free fibers and film which are characterized by excellent toughness and good tensile strength. The expression "tack-free" is defined as the absence of adhesiveness resulting from external pressure at or about room temperature, i.e. temperatures about 25° C.

Besides being very useful for applications where a tough polymer, such as Example 6 which is drawable into fibers having tensile strengths in the order of 1500 to 2000 p.s.i., the final tack-free products are suitable for impregnating and strengthening relatively weak material such as ordinary paper, asbestos paper and mica paper. Thus, as an example, a 35% by weight solution of the resin of Example 6 in toluene was used to impregnate asbestos paper about 3.5 mils thick. Before impregnation, a ½ inch by 8 inch strip of such paper had a tensile strength as measured in a Scott testing machine of 5 ounces per inch width. Such strips impregnated with the 35% resin solution and cured for 15 minutes at 200° C. had a tensile strength of about 110 ounces per inch. The strips when impregnated had a thickness varying from about 4.2 to 4.4 mils. When the 35% resin solution had added to it 0.15% triethanolamine as a curing agent, the tensile strength rose to 124 ounces per inch. When the 35% resin impregnating solution was catalyzed with 0.15% triethanolamine and 0.012% zinc octoate, such strips had a tensile strength of 122 ounces. Other catalysts such as dicumyl peroxide, tetrabutyl titanate, benzoyl peroxide and tetra (2-ethylhexyl) titanate gave comparable results. From the above it will be evident that the final product of the invention can be advantageously used to increase the strength of relatively weak fibrous materials many fold. The inherent heat resisting nature of the resin as well as its good electrical characteristics enables such materials to be used as insulation for electrical applications where temperatures up to 250° C. are experienced. For example, mica paper tape was impregnated with a 35% by weight solution of the material as above and a layer of mica flakes coated on one side of the impregnated tape. The surface of the tape was then coated with a 60%–80% by weight solution of the material in mineral spirits and the tape wound around a generator bar assembly. The material was air dried, although heat can be used to hasten the process, to present a mechanically strong and electrically insulated bar structure. The products of the invention are also useful as laminating impregnants.

What I claim as new and desire to secure by Letters Patent of the United States is:

1. Fibers produced by drawing the siloxane product of intercondensation of a mixture of ingredients comprising (1) from 69 to 97 parts by weight of an organopolysiloxane cohydrolysis product of a lower alkyl hydrolyzable silane having a ratio of three lower alkyl radicals per silicon atom attached to silicon through carbon-silicon linkages and a lower alkyl silicate where the said lower alkyl hydrolyzable silane and the said lower alkyl silicate are cohydrolyzed in the ratio of from about 0.33 to 0.55 mole of hydrolyzable silane per mole of silicate and (2) from 3 to 31 parts by weight of a linear high viscosity organopolysiloxane fluid having terminal silicon-bonded hydroxy groups and having a ratio of about 2 organic groups per silicon atom, the organic groups of said fluid being attached to silicon through silicon-carbon linkages and being selected from the class consisting of alkyl radicals, aryl radicals, alkaryl radicals, aralkyl radicals, haloaryl radicals, alkenyl radicals, and mixtures thereof, said fluid having a viscosity of from about 200,000 to 2,000,000 centipoises.

2. Fibers produced by drawing the siloxane product of intercondensation of a mixture of ingredients comprising (1) from 69 to 85 parts by weight of an organopolysiloxane cohydrolysis product of a lower alkyl hydrolyzable silane having a ratio of three lower alkyl radicals per silicon atom attached to silicon through carbon-silicon linkages and a lower alkyl silicate where the said lower alkyl hydrolyzable silane and the said lower alkyl silicate are reacted in the ratio of from about 0.45 to 0.55 mole of hydrolyzable silane per mole of silicate and (2) from 16 to 31 parts by weight of a linear high viscosity organopolysiloxane fluid having terminal silicon-bonded hydroxy groups and having a ratio of about 2 organic groups per silicon atom, the organic groups of said fluid being attached to silicon through silicon-carbon linkages and being selected from the class consisting of alkyl radicals, aryl radicals, alkaryl radicals, aralkyl radicals, haloaryl radicals, alkenyl radicals, and mixtures thereof, said fluid having a viscosity of from about 200,000 to 2,000,000 centipoises.

3. Fibers produced by drawing the siloxane product of intercondensation of a mixture of ingredients comprising (1) from 69 to 97 parts by weight of an organopolysiloxane cohydrolysis product of a trimethylchlorosilane and ethyl silicate where the said trimethylchlorosilane and the said ethyl silicate are reacted in the ratio of from about 0.33 to 0.55 mole of the silane per mole of silicate and (2) from 3 to 31 parts by weight of a linear high viscosity dimethylpolysiloxane fluid having terminal silicon-bonded hydroxy groups, said fluid having a viscosity of from about 200,000 to 2,000,000 centipoises.

References Cited in the file of this patent

UNITED STATES PATENTS 2,814,601   Currie et al. _____ Nov. 26, 1957

OTHER REFERENCES

"Silicones and Their Uses," McGregor, McGraw-Hill Book Company, Inc., New York (1954).